United States Patent [19]
Schrock et al.

[11] Patent Number: 5,318,475
[45] Date of Patent: Jun. 7, 1994

[54] APPARATUS FOR MEASURING MASS FLOW OF GRAIN IN A HARVESTING MACHINE

[75] Inventors: Mark D. Schrock, Manhattan, Kans.; Kevin Howard, Greenville, Miss.; Darrell Oard; Dennis Kuhlman, both of Manhattan, both of Kans.

[73] Assignee: Case Corporation, Racine, Wis.

[21] Appl. No.: 901,083

[22] Filed: Jun. 19, 1992

[51] Int. Cl.⁵ .................. A01D 61/04; A01F 12/00
[52] U.S. Cl. .............................. 460/1; 460/6; 56/10.2
[58] Field of Search ............... 460/1, 6, 7; 56/10.2, 56/DIG. 15

[56] References Cited

U.S. PATENT DOCUMENTS

| | | |
|---|---|---|
| 3,515,144 | 6/1970 | Morrison . |
| 3,593,720 | 7/1971 | Botterill et al. ......... 56/DIG. 15 X |
| 3,606,745 | 9/1971 | Girodat ...................... 56/20 |
| 3,610,252 | 10/1971 | DeCoene et al. ......... 56/DIG. 15 X |
| 3,638,659 | 2/1972 | Dahlquist et al. ........ 56/DIG. 15 X |
| 3,935,866 | 2/1976 | Northup et al. ......... 56/DIG. 15 X |
| 3,939,846 | 2/1976 | Drozhzhin et al. ................. 460/1 |
| 4,068,223 | 1/1978 | Steffen .................. 56/10.2 X |
| 4,230,130 | 10/1980 | Staiert .................... 460/4 |
| 5,173,079 | 12/1992 | Gerrish .................... 460/7 |

OTHER PUBLICATIONS

J. DeBaerdemaeker, R. Delcroix, P. Lindemans, 1985. Monitoring The Grain Flow On Combines. Proceedings of the Agrimotion 1 Conference and Exposition, pp. 329-338.

L. E. Wagner and M. D. Schrock. 1988. Yield Determination Using a Pivoted Auger Flow Sensor. ASAE Paper No. 87-1516.

L. E. Wagner and M. D. Schrock. 1987. Grain Flow Measurement with a Pivoted Auger. ASAE Paper No. 86-1581.

*Primary Examiner*—Terry Lee Melius
*Attorney, Agent, or Firm*—Rudnick & Wolfe

[57] ABSTRACT

A monitoring system for computing mass flow of cleaned grain in a harvesting machine such as a combine. The monitoring system includes a system for conveying clean grain from a grain receiving area on the combine and along a predetermined path of travel to a clean grain storage bin on the combine. A grain weighing station is interposed along the predetermined path of grain travel between the grain receiving area and the storage bin. The weighing station is displacable in response to clean grain passing thereover. A measuring apparatus, including a load sensor arranged in combination with and monitoring the displacement of the weighing station, computes the mass flow of clean grain into the storage bin as a function of the displacement of the weighing station.

18 Claims, 5 Drawing Sheets

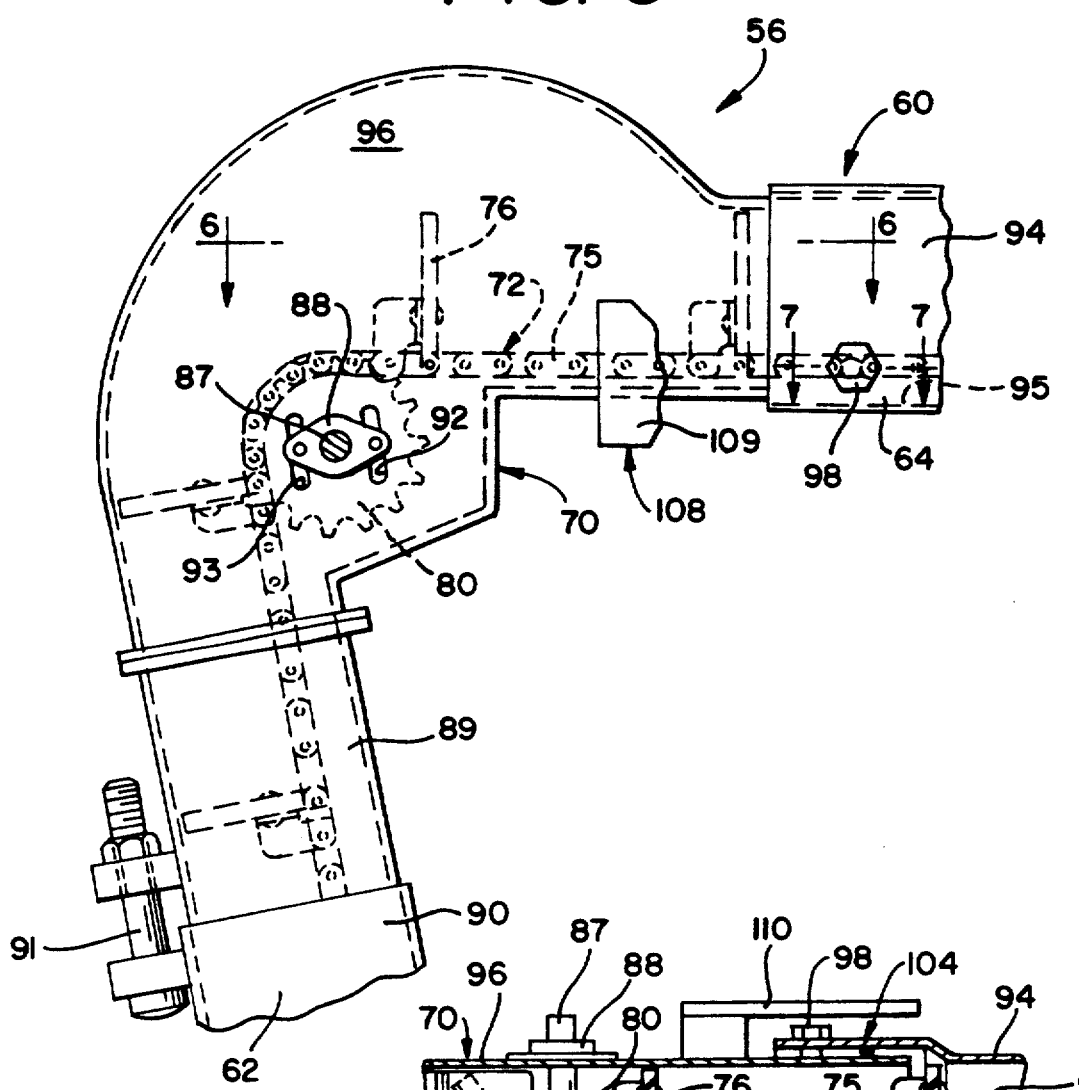
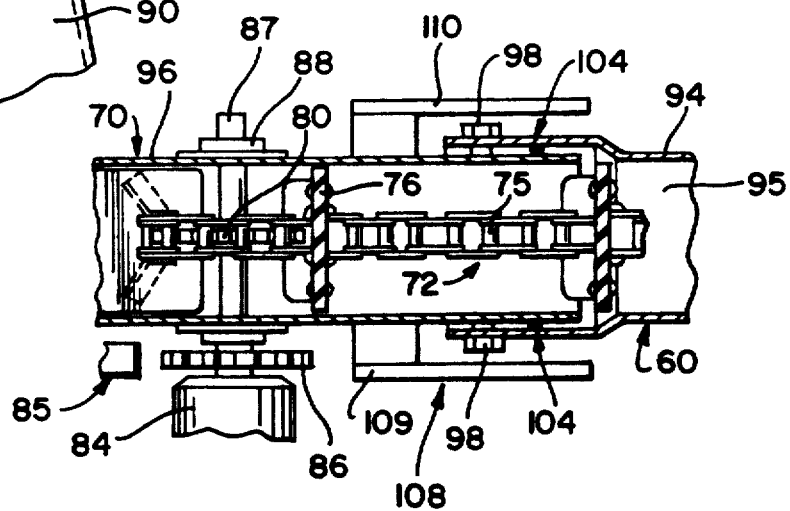
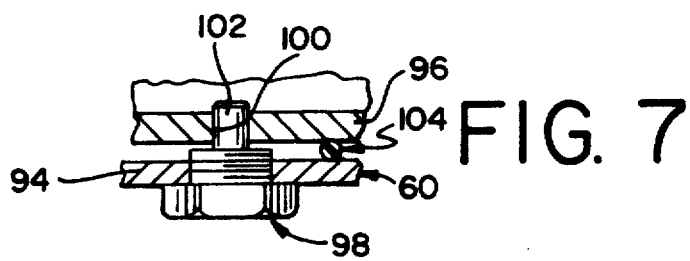

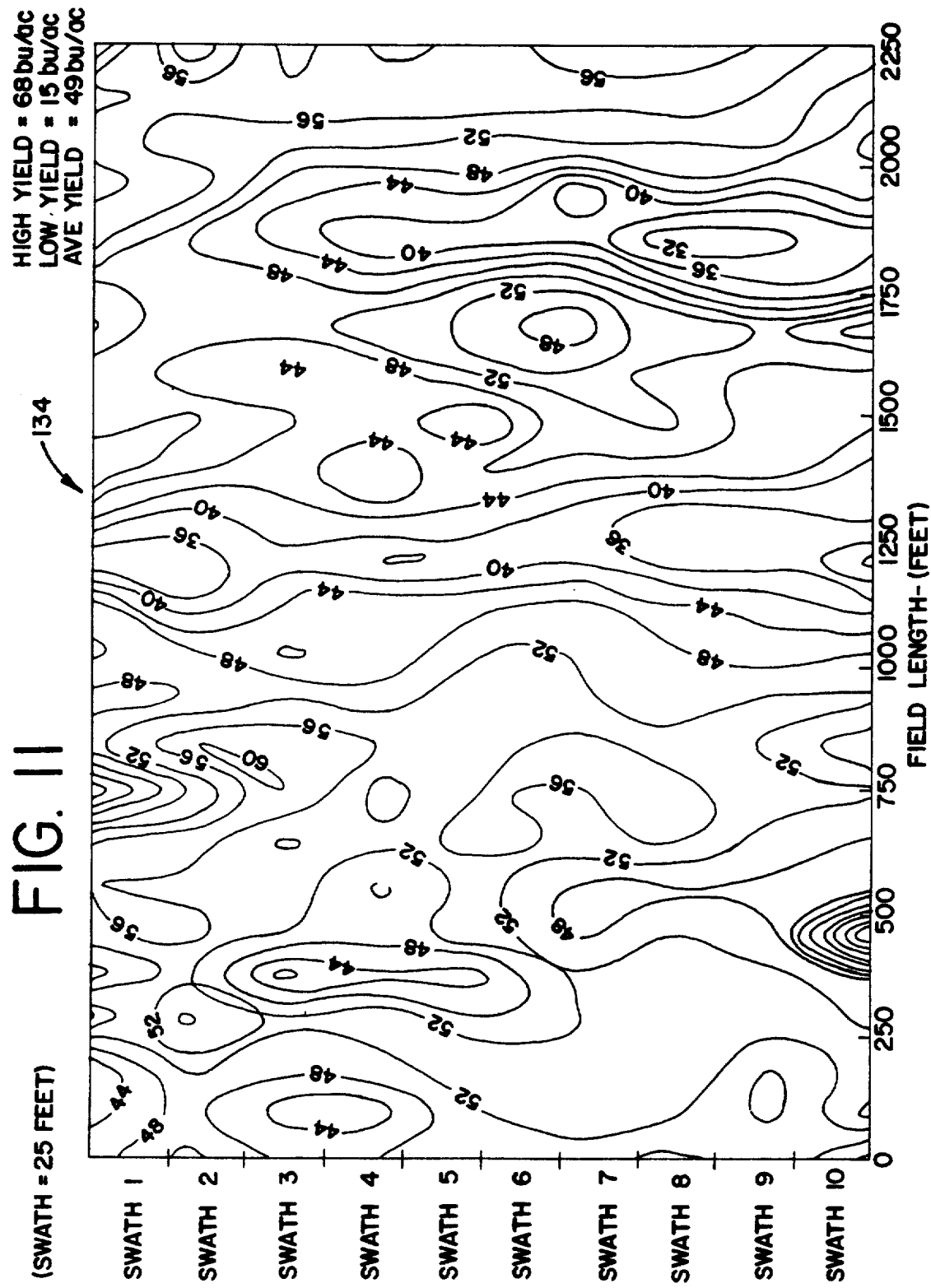

APPARATUS FOR MEASURING MASS FLOW OF GRAIN IN A HARVESTING MACHINE

FIELD OF THE INVENTION

The present invention generally relates to combines and, more particularly, to an apparatus for continuously measuring mass flow of grain in the combine.

BACKGROUND OF THE INVENTION

In the operation of certain types of harvesting machines such as combines, harvested materials are processed by a threshing mechanism wherein most of the kernels of grain are separated from the materials other than grain. Subsequent cleaning of the threshed materials is usually provided for by a cleaning system from which cleaned grain exits. As used herein, the term "grain" is meant to include corn, wheat, rye, oats, barley, flax seed, sorghum, soy beans, sunflower seeds, grass seeds, alfalfa, mixed grain, rice, and any other food grain, feed grain, oil seeds and the like.

A combine used to harvest grain is typically equipped to operate at a variety of ground speeds to accommodate different crop conditions. Crop conditions which vary include crop density, moisture content of the crop, desired quality of grain, and straw per acre. As will be appreciated, all these factors affect the harvesting of the crop.

Prescription farming or tuning of fertilizer or pesticide applications can have a significant influence on crop yields. Heretofore, however, the farmer has not been provided with means suitable to accurately measure grain yields during the harvest and therefore the farmer cannot estimate the possible large spatial variations in crop yields. Moreover, data relating to mass grain flow measurements, if available, could be used by a farmer to reference the order-of-magnitude of crop yields when dealing with traders and shippers.

Thus, there is a need and a desire for a system which monitors mass flow of clean grain in a combine.

SUMMARY OF THE INVENTION

In view of the above, the present invention provides a monitoring system for computing mass flow of clean grain in a harvesting machine such as a combine. The combine includes a mechanism for separating grain from the remainder of harvested crop materials, a grain receiving area which gravitationally receives cleaned grain from the separating mechanism, and a grain storage bin or area for storage of clean grain. The monitoring system is incorporated into a system for moving clean grain along a predetermined path of travel from the grain receiving area to the storage bin area on the combine. A grain weighing station is interposed along the predetermined path of grain travel between the grain receiving area and the storage bin area. The weighing station is displacable in response to the grain passing thereover. A measuring apparatus, including a load sensor arranged in combination with and monitoring the displacement of the weighing station, computes the mass flow of clean grain into the storage bin as a function of the displacement of the weighing station.

In a preferred form of the invention, the system for moving the grain includes an elevator mechanism having the weighing station formed as part thereof. In the illustrated form of the invention, the elevator mechanism includes a housing with a conveyor assembly including an endless drive having a series of flights or paddles carried on and driven thereby. The endless drive of the conveyor assembly is entrained about a series of rotatable members.

In a most preferred form of the invention, the elevator mechanism is arranged in a triangular configuration including a grain inlet area whereat grain is introduced into the conveyor, a grain outlet area, and with the weighing station being arranged intermediate the inlet and outlet areas of the elevator mechanism. The triangular configuration of the elevator mechanism includes a first section including the weighing station over which grain passes. The elevator mechanism also includes a second section joined to the first section. The elevator mechanism further includes a third section joined at opposite ends to the first and second sections. The weighing station can range in length between about eight inches and about 40 inches. When the elevator mechanism embodies a triangular configuration, the rotatable members about which the endless drive of the conveyor assembly moves are mounted at the joinder of the different sections.

At least one section of the elevator mechanism housing is preferably comprised of two housing pieces arranged in telescoping relation relative to each other and provided intermediate the rotatable members arranged toward opposite ends of the respective section. The telescopic relationship between the housing pieces allows them to be linearly positioned relative to each other thereby adjusting the distance between the respective rotatable members and, thus, maintaining tension on the conveyor assembly.

In a most preferred form of the invention, the weighing station includes a platform which is movable and sealed relative to the remainder of the elevator mechanism so as to inhibit grain from passing therebetween. The weighing platform is preferably pivotally movable in a vertical direction in response to the weight of grain passing thereover. The measuring apparatus of the monitoring system computes the mass flow of grain into the storage bin based on outputs received from the load sensor positioned to monitor movements or displacement of the weighing platform. The measuring apparatus uses an algorithm which preferably includes grain bulk density to compensate for crop and moisture content. The measuring apparatus can be further programmed to compensate for noise generated by the elevator mechanism during operation of the combine thereby facilitating the overall operation of the monitoring system.

In a most preferred form of the invention, the monitoring system further includes a device for deriving a signal indicative of the ground speed of the combine. The ground speed signal is inputted to the measuring apparatus of the monitoring system and computed to yield an indication of bushels per acre of clean grain harvested by the combine.

The monitoring system of the present invention is relatively simple, inexpensive, and can readily be incorporated into a harvesting machine such as a combine to monitor mass flow rate of clean grain. Use of such a monitoring system will allow the operator to optimize efficiency of the combine during a harvest. Moreover, because the monitoring system can be conditioned to identify crops and particular crop conditions, the measurement value computed by the monitoring system will more accurately reflect mass flow of clean grain in the combine.

In recent years, considerable effort has been focused on control of crop production practices to match the needs of specific areas of the field. A map of the grain yield is one source of information that can be used in developing an approach to prescription farming. That is, yield maps could be used for accurately evaluating crop production and can be used as a feedback tool for grain producers. For example, a yield map might illuminate previously unknown problems with fertility, drainage, or disease. As will be appreciated, the mass flow monitoring apparatus of the present invention can readily adapt and be used as a key element of a grain yield monitoring system which cooperates with a global positioning system to promote efficient and effective combine harvesting performance during harvesting seasons.

Another feature of the present invention relates to a method of measuring mass flow of grain in a variable speed combine having a threshing apparatus for separating clean grain from harvested materials, a grain receiving area whereat cleaned grain is gravitationally received from the separating means, and an area wherein clean grain is stored. The above-mentioned method includes the steps of: moving the cleaned grain from the grain receiving area to the storage area along a predetermined path of travel; passing the grain over a weight sensitive platform of a predetermined size as the grain moves along the predetermined path of travel; weighing the grain passing over the platform; monitoring the speed at which the grain is moving; and computing the mass flow of clean grain by the following algorithm:

$$Flow\ rate = W \times V$$

Where $W$ = the mass of grain per unit length contained in the weighing platform; and Where $V$ = the speed at which the grain is moving as determined from the step of monitoring the speed of the moving grain.

The step of weighing the grain passing over the sized platform includes the following step: computing an equation associated with the particular grain being harvested; and computing the bulk density of the grain being harvested. To establish crop yield in bushels per acre, the flow rate computed above is multiplied by a constant "K" (representative of a factor used to convert the computed values into like measurements) and divided by the header width times the ground speed of the combine.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

BRIEF DESCRIPTION OF THE DRAWINGS

FIG. 5 is an enlarged side elevational view of a portion of the monitoring system;

FIG. 6 is a sectional view taken along line 6—6 of FIG. 5;

FIG. 7 is an enlarged sectional view taken along line 7—7 of FIG. 5;

FIG. 11 is a schematic view of a map which could be generated from outputs produced by the monitoring system of the present invention.

DETAILED DESCRIPTION OF THE PRESENT INVENTION

Figure 1:
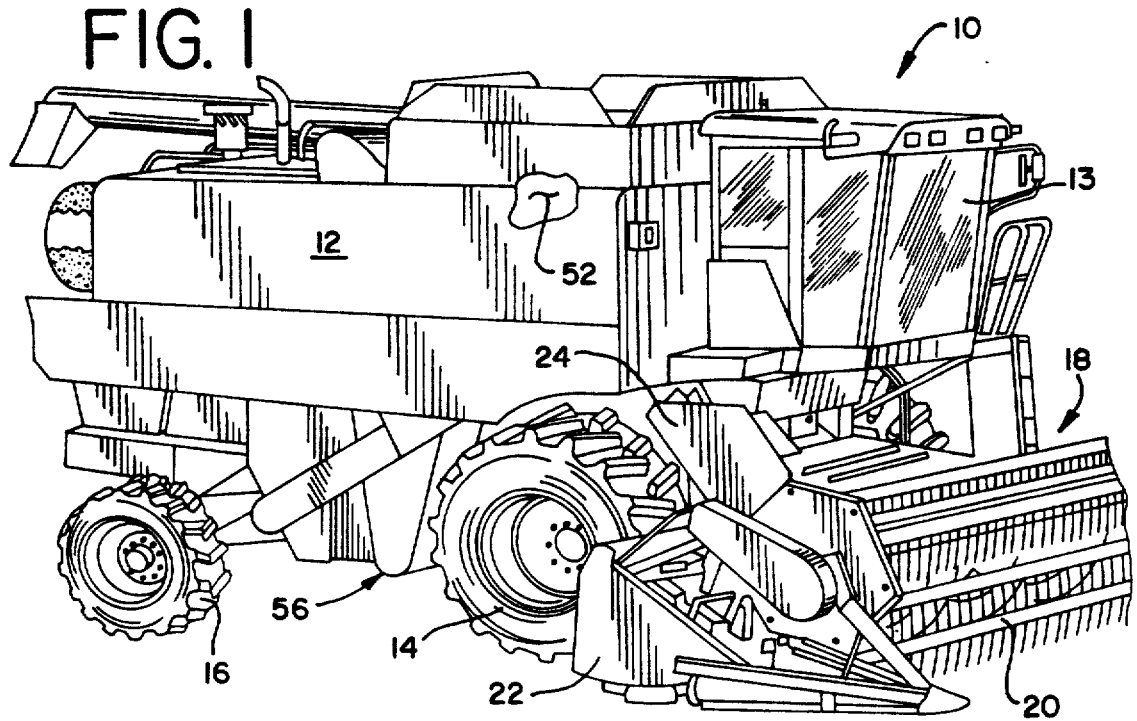
FIG. 1 is a perspective view of a harvesting machine such as a combine which incorporates teachings of the present invention.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals indicate like parts throughout the several views, there is shown in FIG. 1 a self-propelled harvesting machine or combine 10 movable over a field at various ground speeds. Combine 10 is preferably of the type marketed by the assignee herein and sold under Model No. 1680. The combine includes a housing or body 12 having an interconnected frame structure including a cab region or operator station 13. The combine body 12 is supported by front drive wheels 14 and rear steerable wheels 16. The combine is operatively powered by an engine (not shown) suitably supported and housed within the body 12 and which provides driving power for the combine. The transfer of rotation and power from the engine to various driven components of the combine is of a conventional nature and could include fixed or variable belt/chain drives, or hydraulic drives which are not shown or described herein but are well known in the art.

At its front or forward end, the combine is provided with a crop harvesting apparatus or a header 18 which can be of any suitable design. In accordance with normal combine construction, the header 18 includes a reel 20 which is rotatably mounted on a housing 22 to harvest crop material.

The crop harvesting apparatus 18 cuts and directs harvested material toward a crop feeder mechanism 24. The crop feeder mechanism 24 preferably includes a chain and slot conveyor that upwardly and rearwardly moves harvested material in a crop layer or mat toward a threshing area provided within body 12 of the combine and wherein grain is separated from material other than grain.

Figure 2:
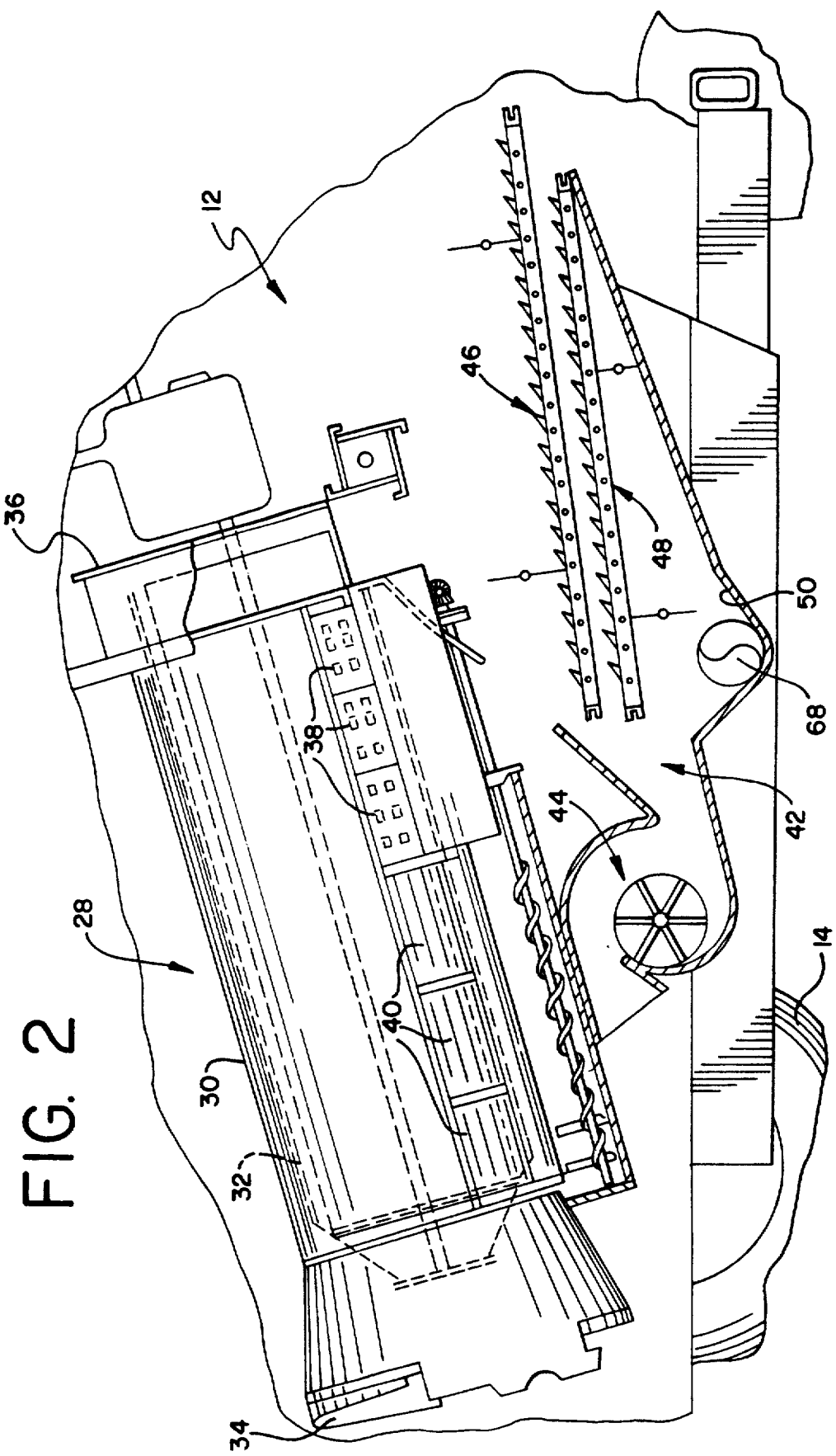
FIG. 2 is an enlarged partial cross-sectional side elevational view of a preferred threshing apparatus and cleaning system embodied within the combine.

Turning to FIG. 2, the threshing area of the combine is preferably defined by a conventional rotor assembly 28 including a threshing cage 30 and a rotor 32. It should be appreciated, however, that the principals of the present invention equally apply to combines having threshing instrumentalities other than that schematically illustrated. As illustrated, the threshing cage 30 has a generally cylindrical and at least partially foraminous configuration with the rotor 32 mounted for rotation therewithin. The rotor 32 is driven at variable speeds from the engine and directs harvested materials to be threshed from an inlet or upstream end 34 of the separating apparatus toward an exit or downstream end 36.

Between the upstream and downstream ends of the rotor assembly 28, the harvested material is threshed several times repeatedly, but gently as it spirals around the single large diameter rotor 32 and passes through the threshing cage 30. In a conventional manner, suitable threshing instrumentalities on the rotor 32 cooperate respectively with semi-cylindrical concaves 38 and semi-cylindrical grates 40 provided on the threshing cage 30.

Threshed materials including grain along with chaff, straw, and other residue material exiting the rotor assembly 28 are received by a cleaning system 42 likewise arranged within body 12 of combine 10. Cleaning system 42 is conventional in nature and preferably includes a cleaning fan 44 and a pair of reciprocally driven sieves 46 and 48. The directed air stream from fan 44 separates chaff, straw, tailings, and other foreign matter from the threshed materials received by the cleaning system. Cleaned grain is allowed to pass through sieves 46, 48 and gravitationally passes to a grain receiving area or collection vessel 50.

During operation of the combine, cleaned grain is passed along a predetermined path of travel from the grain receiving area 50 to a grain storage bin 52 (FIG. 1) provided within the body 12 of combine 10. Between the receiving area 50 and grain storage bin 52, a monitoring system, structured in accordance with the present invention, continuously measures mass flow of cleaned grain in the combine.

In a presently preferred embodiment, the monitoring system includes an elevator assembly 56 arranged on the combine for conveying or moving cleaned grain from the clean grain receiving area 50 to the storage bin 52. In operation, the elevator mechanism or assembly 56 receives clean grain at a receiving station 58 defined by the elevator mechanism and delivers the clean grain along a predetermined path of travel to the storage bin 52. Interposed along a predetermined path of travel, the monitoring system of the present invention includes a weighing station, indicated generally be reference numeral 60, which is isolated from the remainder of the elevator mechanism 56 and is sensitive to the weight of the grain passing thereover. Notably, all grain passing to the storage bin 52 passes over the weighing station 60.

The elevator mechanism 56 can take a plurality of configurations. It is within the scope of the present invention to rectangularly configure the elevator mechanism 56 in an endless loop which encircles the threshing area of the combine. Horizontal portions or sections of such an elevator mechanism would pass below the sieves 46 and 48 and across the top of body 12 of the combine to discharge clean grain into the grain storage bin 52. In a preferred form of the invention, however, the elevator mechanism 56 has a triangular configuration including a first section 62 joined to a second section 64, and a third section 66 joined at opposite ends to the first and second sections 62 and 64, respectively.

Figure 4:
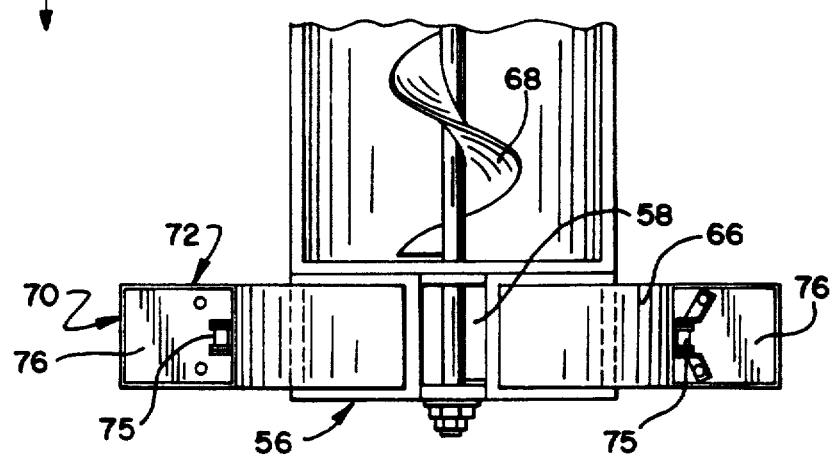
FIG. 4 is a sectional view taken along line 4—4 of FIG. 3.

In the preferred embodiment, the receiving station 58 for the elevator mechanism is provided in an area where the first and third sections 62 and 66, respectively, are joined. As shown in FIG. 4, an auger 68 conveys cleaned grain from the receiving area 50 (FIG. 2) to the receiving station 58 of the elevator mechanism.

In the illustrated embodiment, the second section 64 of the elevator mechanism 56 incorporates the weighing section 60 between opposite ends thereof. While section 64 is shown as being generally horizontal, it should be appreciated and testing has revealed that considerable angular fore-and-aft deviation of section 64 including weighing station 60 to either side of a generally horizontal orientation does not detract from the accuracy of the present invention. Accordingly, and albeit illustrated as generally horizontal, it is well within the scope of the present invention that weighing section 60 be disposed in other than a generally horizontal orientation.

Moreover, there is no reason why the weighing station must be located at the top of the elevator mechanism 56. The elevator mechanism could have an alternative triangular configuration with the weighing station 60 arranged substantially level with the cross auger 68. Grain then would first be moved across the weighing station 60, and then vertically upward toward the grain storage bin 52. The weighing station 60 would effectively function as an "undershot" conveyor. This alternative design may furthermore reduce grain slippage in the elevator mechanism 56.

In the illustrated embodiment, the elevator mechanism 56 includes a housing 70 and a conveyor assembly 72 which positively moves grain through the housing 70. Housing 70 preferably has a hollow generally rectangular cross-sectional configuration and includes an outlet 74 from which grain is discharged into the storage bin 52 of the combine.

Figure 3:
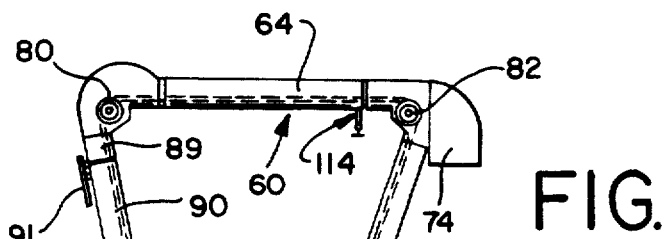
FIG. 3 is a schematic side elevational view of one form of a monitoring system incorporated within a body of the combine.

Conveyor assembly 72 includes an endless drive chain or cable 75 having a series of flights or paddles 76 secured thereto and driven thereby. As shown in FIG. 3, chain 75 is entrained about a series of sprockets 78, 80, and 82 which are mounted to housing 70 proximate the joinder of the sections 62, 64 and 66 of housing 70. As shown in FIG. 6, a motor 84 suitably mounted on housing 70 may be connected to sprocket 80 to drive the conveyor assembly 72. Notably, motor 84 is arranged upstream or in advance of the weighing station 60 in the direction of movement of the conveyor assembly 72 to relieve tension on the conveyor assembly as it passes over the weighing station 60. This should greatly reduce the sensitivity of the monitoring system of the present invention to misalignment and wear of the flights 76. Alternatively, sprocket 78 may be connected to and driven by auger 68 which, in turn, is driven by a motor or the like.

As shown in FIG. 6, the driving speed of the conveyor assembly 72 and thus the speed of the grain moving through the housing and across the sized weighing station 60 is measured by a suitable sensor 85. In the illustrated embodiment, the sensor 85 monitors the revolutions of a sprocket 86 which is driven in timed relation with the conveyor assembly 72.

Returning to FIG. 5, each sprocket about which the chain 75 of conveyor assembly 72 is entrained and mounted for rotation about a shaft 87 which is supported at opposite ends by suitable supports 88 which are connected to housing 70. Notably, in the illustrated embodiment, sprocket 86 associated with sensor means 85 is fixedly secured to rotate with shaft 87.

Elevator mechanism 56 further includes an adjustment mechanism for adjustably tensioning the conveyor assembly 72 so as to remove slack within the chain 75 of conveyor 72. Normally, the conveyor assembly 72 operates under about 500 pounds of tension being applied thereto. As shown in FIGS. 3 and 5, at least one section of housing 70 is comprised of two housing pieces 89 and 90 which are joined to each other in telescopic relation and intermediate the rotatable members arranged toward opposite ends of the respective section. A suitable adjustment mechanism 91 including a threaded member joins housing pieces 89 and 90 to each other in fixed relation and furthermore allows the effective linear length of the respective elevator section to be readily adjusted to compensate for changes in the effective length of the conveyor assembly 72. As will be appreciated, the ability to linearly move the housing pieces 89 and 90 relative to each other changes the distance separating the rotatable members arranged toward opposite ends of the respective elevator section thus maintaining an adjustable level of tension on the chain 75 of conveyor assembly 72. As will be appreciated, maintaining the chain 75 of conveyor assembly 72 taut will reduce noise generated by the chain 75 and flights 76 as the conveyor assembly 72 operates to move grain through the elevator.

As shown in FIG. 5, at that end of the elevator section including housing pieces 89 and 90, housing 70 is preferably provided with generally vertical slots 92 and 93 which allow sliding movement of the supports 88 thereby elevationally positioning the sprocket associated therewith. Elevational movement of the sprocket allows the conveyor assembly 72 to be properly positioned or aligned relative to a lower wall of the housing 70 to inhibit inadvertent loading of the weighing station 60 by the chain 75 or flights 76 and to inhibit grain from slipping beneath the flights 76.

In the illustrated embodiment, weighing station 60 forms an active part of the second section 64 of elevator 56 and is interposed between opposite ends thereof. The weighing station 60 preferably includes a tubular housing 94 including a generally horizontal platform 95 over which grain passes. In the illustrated embodiment, the weighing station housing 94 is configured with a cross-section substantially equal in size to that of housing 70. The weighing station 60 has a predetermined size that may range in length between about eight inches and about 40 inches.

As shown in FIGS. 5 and 6, an elbow or boot 96 forms a part of the second section 64 and is affixed to first section 62 of the elevator mechanism 56. At its distal end, boot 96 supports one end of the weighing section 60. In the illustrated embodiment, axially aligned bolts 98 are provided to pivotally secure one end of the weighing station housing 94 to the distal end of boot 96. Bolts 98 are preferably arranged such that the pivot axis for the weighing station 60 is disposed at substantially the same level as the chain or cable 75 of the conveyor assembly 72 moving across the weighing station 60.

As shown in FIG. 7, each bolt 98 is provided with a shouldered pin 100 which is received within an aperture 102 defined on a vertical wall of the boot 96. Thus, housing 94 is weight sensitive to grain passing thereover. That is, the weighing station 60 vertically moves about a generally horizontal axis defined by the axially aligned pins 100 of bolts 98 in response to the weight of the grain passing thereover.

The weighing station housing 94 is suitably sealed at opposite ends relative to the remainder of the elevator mechanism 56 to inhibit cleaned grain from inadvertently escaping between the junctions as the conveyor assembly 72 positively moves grain through the elevator mechanism 56. A suitable seal 104, preferably fabricated from open cell low density foam material configured with a tubular cross section, inhibit clean grain from escaping from the elevator mechanism 56 at the joinder of boot 96 with the weighing station housing 94. Of course, the seal 104 may take any suitable form which reduces the spring rate thereof and does not substantially inhibit free movement of the weighing station 60 in response to the weight of grain passing thereover.

Figure 8:
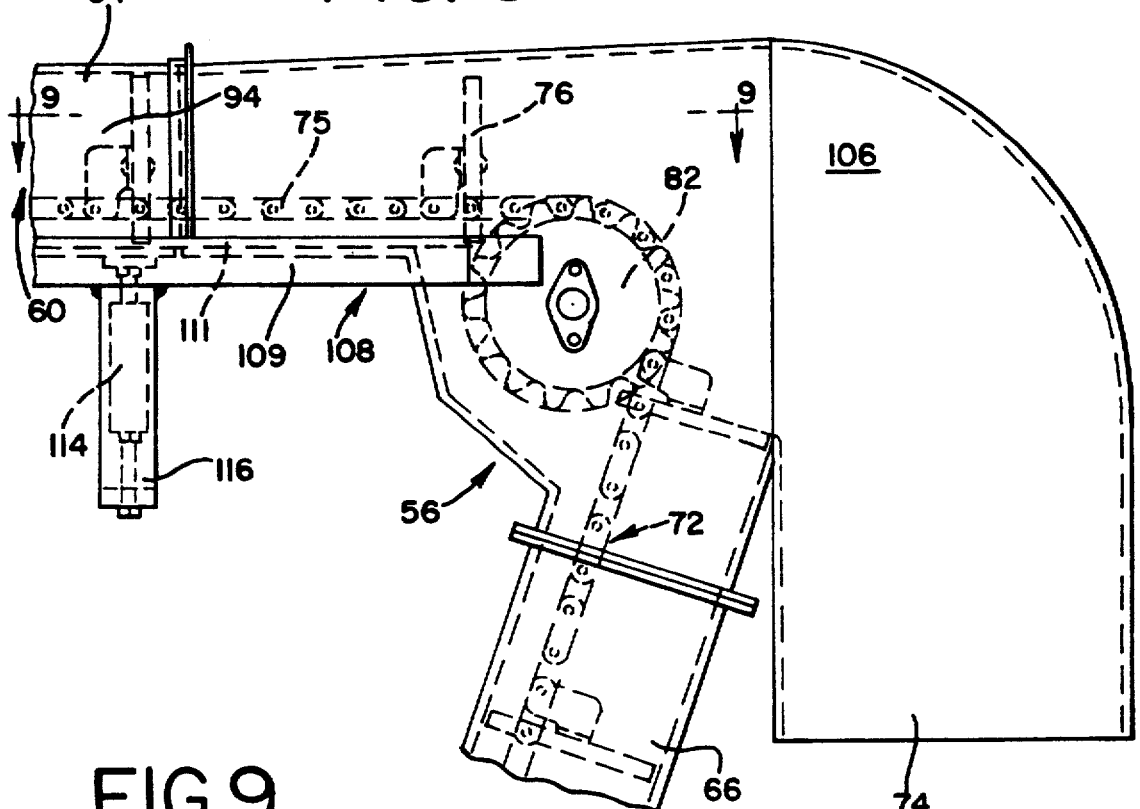
FIG. 8 is an enlarged side elevational view of another portion of the monitoring system of the present invention.
Figure 9:
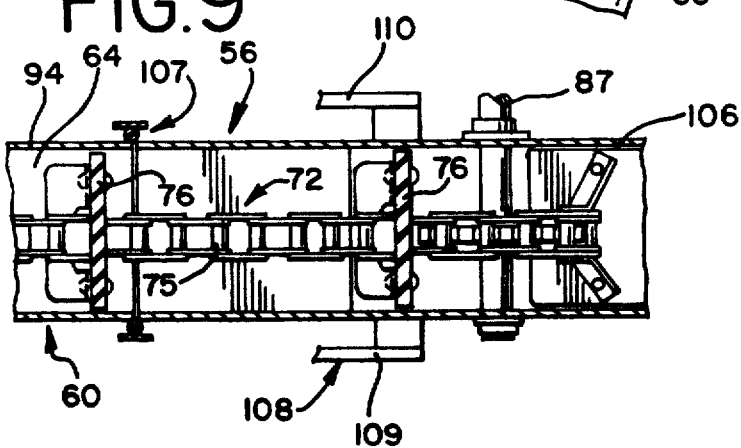
FIG. 9 is a sectional view taken along line 9—9 of FIG. 8.
Figure 10:
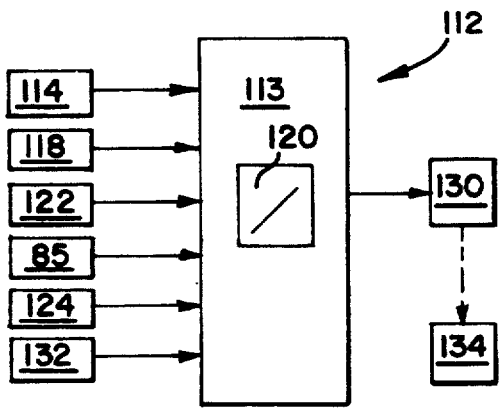
FIG. 10 is a schematic representation of a computer based measuring apparatus forming part of the monitoring system of the present invention.

Turning to FIGS. 8 and 9, an elbow or boot 106 likewise forms a part of the second section 64 and is attached to the third section 66 of the elevator mechanism 56. At one end, boot 106 defines the discharge 74 for the elevator mechanism. At its other end, boot 106 supports an opposite end of the housing 94 of weighing station 60. A suitable seal 107, substantially similar to the seal 104 discussed above, provide an adequate seal between the discharge end of weighing station 60 and the boot 106 to inhibit grain from escaping therebetween.

With slight redesign efforts concerning the relationship between the weighing station 60 and the second section 64 of elevator mechanism housing 70, the seal 107 could be eliminated from the elevator mechanism. Such redesign effort would include reconfiguring the boot 106 and moving the pivot location of the weighing station 60 to the opposite end of housing 94 from that discussed above. Grain would then be delivered directly from the weighing station to the storage bin 52 and no seal would be required at the discharge boot 106.

To maintain the weighing station 60 isolated from structural loads, the elevator mechanism 56 includes a rigid bridge 108 including generally horizontal beams 109 and 110 joined at opposite ends to boots 96 and 106. Bridge 108 will transmit structural forces between boots 96 and 106 without imparting structural loads to the active weighing station 60. The bridge 108 will serve to preserve the relative geometry of the various parts of the housing 70 as the conveyor assembly 72 is tensioned.

In the illustrated embodiment of the invention shown in FIGS. 5 and 8, ingress and egress ends of the weighing station housing 94 are linearly spaced from the sprockets 80 and 82 of the conveyor assembly 72. The spacing between adjacent flights 76 on the conveyor assembly 72 is such that at least one flight 76 is always located between the sprocket 80, 82 and a respective end of the weighing station 60 such that sprocket-induced forces are transmitted to the bottoms of boots 96 and 106 thus inhibiting chordal vibrations of the conveyor assembly from acting against the weighing station 60 thus enhancing the accuracy of the mass flow measurement of the monitoring system of the present invention. In a preferred form of the invention, and as shown in FIG. 8, a nylon wear block 111 is added to the conveyor support surface of elbow or boot 106 to support the conveyor assembly as it feeds onto the sprockets 82 at the discharge end of the elevator mechanism 56. Other elevator designs, however, may be utilized to eliminate dead sections at opposite ends of the weighing section if so desired.

The mass flow monitoring system of the present invention further includes a measuring apparatus 112 for computing mass flow of grain into the storage bin 52 (FIG. 1) of the combine. A programmable computer 113 is a key element to the measuring apparatus 112. The computer 113 is of conventional design and receives data from several different inputs including a load sensor 114 which monitors displacement of the isolated weighing station 60 in response to grain passing thereover.

As shown in FIG. 8, the load sensor 114 is preferably mounted beneath and toward the free end of the isolated weighing station 60 by suitable structure 116 connected to either housing 70 or the bridge 108. The load sensor 114 translates elevational movements of the weighing station 60 into output signals indicative of the weight of the grain passing thereover. A Model No. SL-50-LB load cell or sensor sold by Alphatron, Inc. of Elburn, Ill. is one example of a load sensor suitable for the above mentioned purpose and operation. The output signal of the load sensor 114 is inputted to the computer 113. As will be appreciated, suitable conventional circuitry associated with either the sensor 114 or embodied within the computer 113 will condition the load sensor output signal to take out jitter and otherwise smooth the output of the load sensor. Moreover, the computer based measuring apparatus 112 can be programmed to compensate for noise generated by the conveyor assembly 72 during operation of the combine.

Because weights of grain depend upon the particular crop being harvested, the measuring apparatus 112 of the monitoring system includes a settable mechanism 118 which inputs to the computer 113 the particular grain being harvested. Test weight maps or algorithms 120 for each major crop are stored in suitable memory of computer 113 and are a derivative of a linear or other suitable form of an equation.

Grain volume may be likewise effected by moisture content of the harvested materials. Moisture content of the crop material being harvested is readily ascertainable through measuring devices conventionally known in the art. Moreover, the effect that changes in moisture content have on particular crops is also known. Thus, the measuring apparatus 112 may include means for computing moisture content into the mass flow measurement analysis. Having ascertained the moisture content of the materials being harvested, a suitable mechanism 122 is set to condition the computer 113 such that the moisture content of the crop material being harvested will automatically be computed and factored in mass flow computations performed by computer 113.

The sensor 85 also provides input to the computer 113. The revolutions monitored by sensor means 85 is converted into speed or velocity of grain moving over the sized weighing station 60 as will be discussed in detail hereinafter.

The measuring apparatus 112 may further utilize conventional ground speed sensors 124. Sensors 124 input to the computer 113 the speed and location of the combine as it moves over a field.

During combine operation, the computer 113 examines and analyzes the theoretical relationships between some or all of the above-mentioned inputs to determine the flow rate through the combine. The elevator mechanism 56 through use of the conveyor assembly 72 described above assures substantially no or minimal material slippage past the flights 76 on the conveyor assembly 72 as the grain moves between the grain receiving station 56 and the storage bin 52. As will be appreciated, limited slippage of material as the conveyor assembly 72 moves the material along its predetermined path of travel can be compensated for and the measuring apparatus 112 uses the following algorithm to compute flow rate in the combine:

$$Q = W \times V \qquad \text{Eq. \#1}$$

where:
Q = flow rate as measured in pounds/minute;
W = weight of grain per foot of platform; and
V = velocity of grain movement in feet/minute.

The grain load (W) is measured by the load sensor 114. In the illustrated embodiment, the length of platform 60 is about 40 inches, with a 38 inch distance between the pivot axis of the weighing platform 90 and the load sensor 114. If so required, it may be possible to reduce the length of the isolated weighing station 60 from 40 inches to about eight inches in length. With a 40 inch length for the weighing station, summing moments about the pivot point yields:

$$W = 0.57 \times F \qquad \text{Eq. \#2}$$

where:
F = net load cell reading in pounds.

As mentioned above, the velocity V of the grain moving across the sized weighing station 60 is measured by the sensor means 85 monitoring revolutions of sprocket 80. Accordingly, the velocity V of the grain is equal to the chain pitch of sprocket 80 times the number of teeth on sprocket 80 times the revolutions per minute of sprocket 80. For a nine tooth sprocket with 1.625 inch chain pitch, chain speed is related to sprocket rpm by the equation:

$$V = 1.2187 \times rpm. \qquad \text{Eq. \#3}$$

Substituting Equations 2 and 3 into Equation 1 yields the theoretical relationship between mass flow, velocity of grain, and weight:

$$Q = 0.69469 \times (rpm \times F). \qquad \text{Eq. \#4}$$

The output of the measuring apparatus 110 and derived from Equation #4 can be provided on a visual display indicator 130 arranged in the cab region 13 of the combine.

The present invention is furthermore capable of providing a flow rate or yield in bushels per acre. To provide a flow rate indication in bushels per acre, the computer 113 of the measuring apparatus would utilize the following algorithm:

$$Q = K(X + Z \times V \times W) / \text{Width of header } 18 \times \text{ground speed.}$$

Where:
Q = Yield as measured in Bushels/Acre;
K = conversion factor used to change mph into feet/minute, square feet into acres, and pounds into bushels;
X = a value indicative of a graphical intercept related to a particular crop being harvested;
Z = a value indicative of a graphical slope related to a particular crop being harvested;

V = velocity of grain moving across the sized platform; and

W = weight of grain per foot of platform.

The velocity of grain (V) moving across the sized weighing station 60 is computed as mentioned above. Similarly, the weight of grain per foot of the weighing station housing 94 (W) is derived from the output of sensor 114 in the same manner as described in detail above. During a normal harvesting operation, a header 18 having a predetermined width is utilized to harvest crop. The predetermined width of header 18 that is used to harvest crop is readily ascertainable. The ground speed of the combine is inputted to the computer 113 by sensors 124. Accordingly, during combine operation the monitoring system of the present invention can readily provide a flow rate as measured in bushels per acre during the combine harvest.

In addition to those inputs to the computer 113 discussed above, a navigation or positioning system 132 can be utilized to provide another input to the computer 113. The navigation system can take many forms including a land or transmitter based system conventionally referred to as a LORAN - C system. Alternatively, the navigation system 132 may be in the form of a global positioning system (GPS). Whatever its form, the navigation system 132 inputs to computer 113 the location of the combine relative to the field. The input from the navigation system 132 when combined with the calculations derived from the monitoring system of the present invention can readily provide a yield map 134 or other form of output. FIG. 11 schematically illustrates a yield map 134 which could be generated for a harvested field through use of the present invention.

Notably, the computer 113 smoothes the input data from the weighing station 60 using a kriging algorithm which weights various values according to a variogram model. The variogram model relates the yield variance and separation distance. Points lying near one another tend to have similar yields, while points separated by larger distances tend to have a larger variance. The smoothed data is plotted on the yield map 134. As discussed above, a yield map is useful in prescription farming techniques and other uses beneficial to the farmer whose field is being harvested.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A grain harvesting machine movable over a field and having a threshing apparatus supported on a frame for separating grain from the remainder of the harvested materials, a grain receiving area on the frame of the machine for gravitationally receiving cleaned grain from the threshing apparatus, a grain storage bin for storage of cleaned grain, and a monitoring system for measuring mass flow of cleaned grain in the harvesting machine, said monitoring system comprising:

an elevator for conveying the cleaned grain from the grain receiving area to the grain storage bin, said elevator including a receiving station whereat cleaned grain is introduced into the elevator, said elevator further including first and second sections arranged in operative association relative to each other for directing grain along a predetermined path and having a weighing station disposed along said predetermined path and between said first and second sections, and wherein said weighing station is movable in response to the weight of the cleaned grain passing thereover; and an operative assembly including a load sensor for monitoring the movement of said weighing station and electronics responsive to an output from said load sensor for computing the mass flow of cleaned grain into the grain storage bin.

2. The grain harvesting machine according to claim 1 wherein the length of said weighing station varies in length between about 8 inches and about 40 inches.

3. The grain harvesting machine according to claim 1 wherein said weighing station is sealed relative to the remainder of the elevator and is pivotally movable in response to passage of cleaned grain thereover.

4. The grain harvesting machine according to claim 1 wherein said elevator includes a housing arranged in combination with an endless drive with a series of flights carried on and driven thereby for positively moving grain between the receiving area of the elevator and the storage bin while maintaining minimum slippage of cleaned grain past said flights.

5. The grain harvesting machine according to claim 1 wherein said operative assembly includes a computer having electronic devices for adjusting the computation of mass flow based on moisture content of the grain being harvested.

6. A combine having a frame adapted for movement over a field of crops to be harvested, a threshing apparatus for separating harvested materials, a crop cleaning system including a reciprocally mounted sieve which receives threshed materials from the threshing apparatus and allows grain to pass therethrough to a grain receiving area, a grain storage bin for storing cleaned grain therein, and a system for measuring mass flow of grain in the combine, said measuring system comprising:

an elevator for moving cleaned grain from the grain receiving area to the storage bin, said elevator having a grain inlet area whereat clean grain is introduced into the elevator, a grain outlet area, and with a weighing station of said elevator being arranged intermediate said inlet and outlet areas and is elevationally movable in response to the weight of clean grain passing thereover, said elevator having a triangular configuration and comprises a first section joined to second and third sections and with a conveyor assembly being housed for movement within the sections of said elevator, and wherein said conveyor assembly includes a driven chain with a series of flights mounted on and driven by the chain; and a measuring apparatus cooperating with the weighing station of the elevator for continuously measuring the mass flow of clean grain into the grain storage bin as a function of the displacement of the weighing station.

7. The combine according to claim 6 wherein the flights of said conveyor assembly have a configuration corresponding to a cross-sectional configuration of said elevator such that grain is inhibited from slipping therepast during movement between the grain receiving area and the storage bin.

8. The combine according to claim 6 wherein said elevator further includes a series of rotatable members mounted proximate the joined ends of each of said sections and about which the driven chain of said conveyor assembly is entrained.

9. The combine according to claim 8 wherein said elevator further includes an adjustment mechanism for adjustably tensioning the conveyor assembly, said adjustment mechanism including an apparatus for displacing at least one of said rotatable members relative to the other rotatable members to maintain tension on the driven chain and thereby reduce noise generated by the conveyor assembly during operation thereof.

10. The combine according to claim 6 wherein said measuring apparatus includes means for compensating for noise generated by the conveyor assembly to provide for accurate mass flow measurements.

11. The combine according to claim 6 wherein said measuring apparatus includes means for compensating for moisture content of the clean grain thereby facilitating accurate mass flow measurement of clean grain.

12. The combine according to claim 6 wherein said weighing station includes an isolated platform, said platform ranging in length between about 10 inches and about 30 inches.

13. A variable speed combine having a wheeled frame, a threshing apparatus for separating harvested materials, a sieve reciprocally mounted on the frame in crop receiving relation with the threshing apparatus for separating grain from material other than grain and for allowing cleaned grain to gravitate toward a clean grain receiving area, a grain storage bin for storing cleaned grain therein, and a system for measuring mass flow of grain harvested by the combine, said measuring system comprising:

a conveyor arranged in grain receiving relation to the clean grain area for positively moving the cleaned grain along a predetermined path to the grain storage bin, said conveyor including a generally horizontal leg over which clean grain passes on its path to the storage bin and which is operatively connected in an endless loop configuration to at least two other legs at opposite ends thereof, the horizontal leg of the conveyor being comprises of a displacable section which is isolated from the remainder of and disposed between opposite ends of said horizontal leg and which vertically moves in response to the passage of clean grain thereover; and a measuring apparatus including a load sensor mounted in relation to the displacable section of the conveyor to compute mass flow of clean grain into the grain storage bin as a function of the vertical displacement of the displacable section of the conveyor.

14. The combine according to claim 13 wherein said conveyor comprises an endless drive entrained about at least two sprockets provided toward opposite ends of the generally horizontal leg of the conveyor, a series of flights connected to and movable with said endless drive, and a housing which surrounds the drive and flights driven thereby, said housing acting to transmit structural forces between opposite ends of the generally horizontal leg of the conveyor.

15. The combine according to claim 13 wherein said measuring system further includes an apparatus for deriving a signal indicative of the ground speed of the combine, and wherein said ground speed signal is inputed to the measuring apparatus and computed to generate an output indicative of the bushels per acre of clean grain harvested by the combine.

16. The combine according to claim 13 wherein said measuring apparatus receives inputs from a navigation system, which inputs are used to generate the output of the measuring apparatus.

17. The combine according to claim 13 wherein said measuring apparatus includes means for reducing the effect noise generated by said conveyor means has on the mass flow measurement of the measuring system.

18. The combine according to claim 13 wherein said measuring apparatus includes means for computing the effect grain bulk density has on the mass flow measurement of the measuring system.

* * * * *